United States Patent  [15] 3,641,865
Swindt et al.  [45] Feb. 15, 1972

[54] SEALING SHEAR FASTENER

[72] Inventors: Joseph K. Swindt, Manhattan Beach; Erwin S. Oelke, Cypress, both of Calif.

[73] Assignee: Blake Rivet Co., South Gate, Calif.

[22] Filed: Apr. 20, 1970

[21] Appl. No.: 29,923

[52] U.S. Cl. ...................85/7, 29/517, 29/520, 29/523, 151/2 R, 287/189.36 F
[51] Int. Cl. ...................F16b 19/05, F16b 39/02
[58] Field of Search ...................85/7, 37, 70, 72, 63, 1 JP; 151/41.74, 14 DW, 14.5, 7, 2, 3; 287/189.36 D, 189.36 F, 20.3; 29/50–523, 515–517, 505; 285/162, 222

[56] References Cited

UNITED STATES PATENTS

| | | |
|---|---|---|
| 3,301,122 | 1/1967 | Wagner ...................85/7 |
| 2,887,003 | 5/1959 | Brilmyer ...................85/72 |
| 3,271,058 | 9/1966 | Anderson ...................151/41.74 X |
| 2,639,832 | 5/1953 | Bergstrom ...................85/1 JP X |
| 1,852,297 | 4/1932 | Gelpcke ...................85/70 X |

FOREIGN PATENTS OR APPLICATIONS 828,003 2/1960 Great Britain ...................151/14 DW Primary Examiner—Ramon S. Britts
Attorney—Edward D. O'Brian

[57] ABSTRACT

A sealing shear fastener comprises a three-part structure arranged for interengagement for joining pieces or for filling a hole. The structure includes a main body having a head and a stem, a retainer, and a ductile sleeve, wherein the ductile sleeve is adapted to be deformed against abutments on the stem and on the retainer to interlock the retainer with respect to the stem.

7 Claims, 6 Drawing Figures

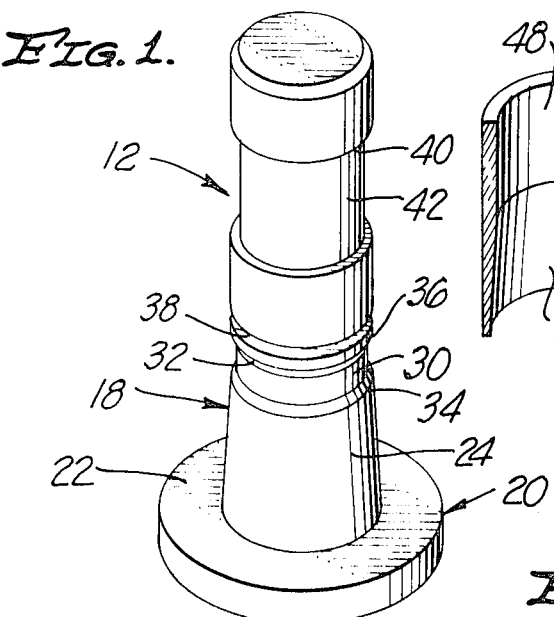
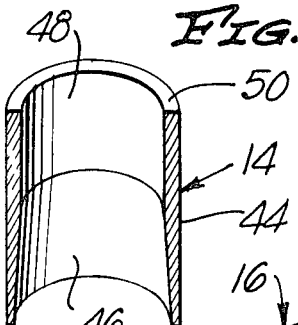
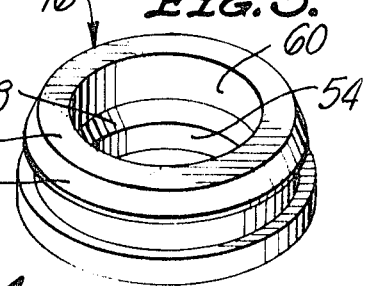
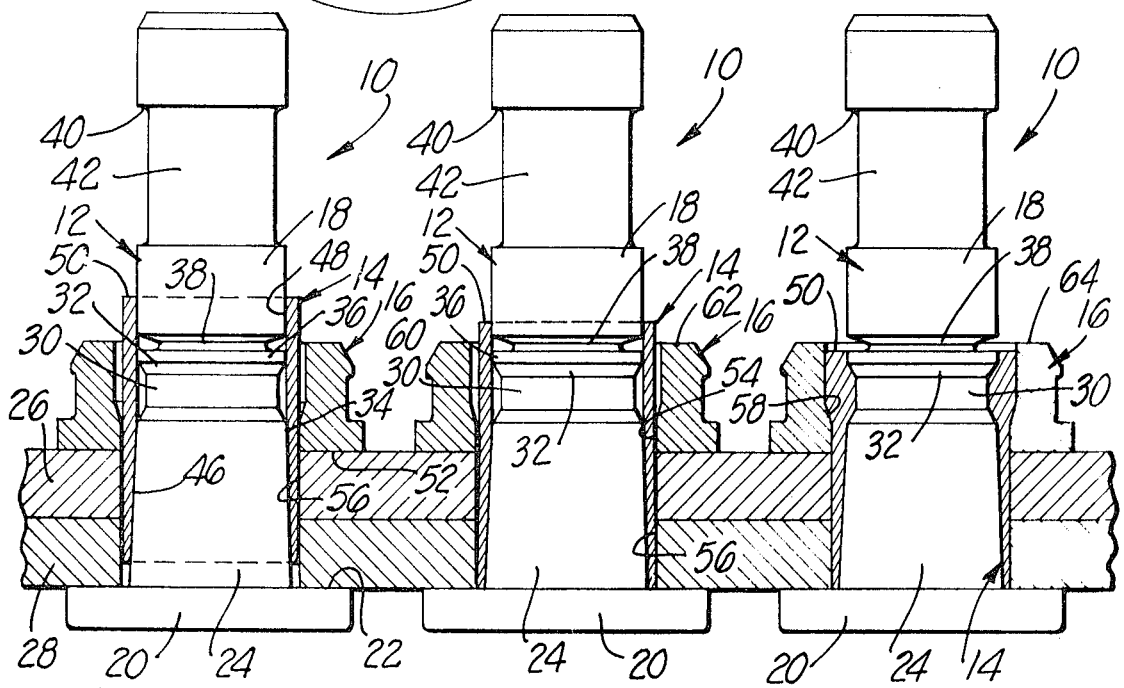
INVENTORS
ERWIN S. OELKE,
JOSEPH K. SWINDT
BY
EDWARD D. O'BRIAN
ATTORNEY

SEALING SHEAR FASTENER

The main body of the rivet has a stem and a head. The head is adapted to engage one of the pieces and the stem goes through a hole in both of the pieces. The stem has a conical surface with its smaller diameter away from the head. At least one locking abutment is circumferentially formed around the stem. The stem preferably also has a pull stem thereon, which can be grasped and pulled during installation to retain the main body in place. The second portion of the sealing rivet is a retainer button. The retainer button is adapted to engage another piece to be joined, and the retainer button has a hole therein through which the stem of the main body extends. The retainer button may have a cylindrical bore therein providing that this bore has at least one abutment facing away from the engaging face of the button. The third piece of this sealing rivet is a ductile sleeve. The ductile sleeve is arranged to fit within holes through the pieces to be joined, fit within the bore of the retainer button and cooperate with the taper of the stem of the main body.

With this structure, the stem of the main body can be pulled while the button is pushed to clamp these parts tightly against the pieces. At the same time, the ductile sleeve is forcibly pushed and ductilely deformed. Since it is tapered with the thinner wall toward the head of the main body, this portion deforms first and fills the space between the stem and the hole in the pieces. Ductile deformation is above plastic stress level and is progressive and continues until both the retaining abutment in the retaining button and the abutment in the stem are filled with ductilely deformed material. By this means, the stem and retainer button are interengaged to make a strong rivet. Furthermore, the ductilely deformed sleeve wholly seals the opening between the pieces and the stem, and between the button and the stem. If desired, the pulling portion of the stem can be removed, preferably by breaking it off at a snapoff groove.

In the bolt embodiment, the relationship of parts is much the same as in the rivet embodiment. The tapered bolt shank fits within a hole and carries a ductile sleeve therearound. The sleeve is tapered in the bolt shank engaging area so that upsetting is progressive. The nut engages the top of the sleeve and thrusts it into space so that the sleeve is upset between the bolt shank and the interior of the hole. Progressive upsetting is thus also accomplished in this embodiment.

BACKGROUND OF THE INVENTION

Modern fastening requires the use of high tensile strength rivet parts. However, ductility is seriously impaired in such high-strength materials so that riveting becomes virtually impossible. High-strength materials provide high-strength rivet heads and shanks, but these have poor riveting capabilities. The prior art does not teach any manner in which high-strength materials can be used in riveting, to obtain the full strength of such materials and yet provide true, sealing riveting.

DESCRIPTION

Accordingly, it is an object of this invention to provide a sealing rivet which employs a main body having a stem and a head which cooperates together with a retainer button embracing the stem and a ductile sleeve which interengages between the stem and the retainer buttons so as to firmly interlock them. Through this construction, high-strength materials can be used, together with ductile material in the sleeve which interengages the parts. It is a further object of this invention to provide a sealing rivet wherein a ductile sleeve interengages between a stem on the main body of the rivet and the interior of the hole in the pieces to be fastened together so that sealing between the stem and the pieces is accomplished. It is a further object of this invention to provide a sealing rivet which is of economic construction so that it may be applied in many different applications. It is another object of this invention to provide a sealing rivet which is easy to use to make a strong joint so that it is economic in construction, application, and have a long, trouble-free life.

Other objects and advantages of this invention will become apparent from a study of the following portion of this specification, the claims and the following drawings.

FIG. 1 is an isometric view of the main body of the sealing rivet of this invention.

FIG. 2 is a longitudinal section taken through the undistorted sleeve of the sealing rivet, before it is installed.

FIG. 3 is an isometric view of the retainer button of this sealing rivet.

FIG. 4 is a longitudinal section taken through pieces to be joined, showing three of the sealing rivets of this invention in various stages of installation.

FIG. 5 is a longitudinal section taken through two joined pieces, showing the completed installation of the sealing rivet of this invention.

Figure 6:
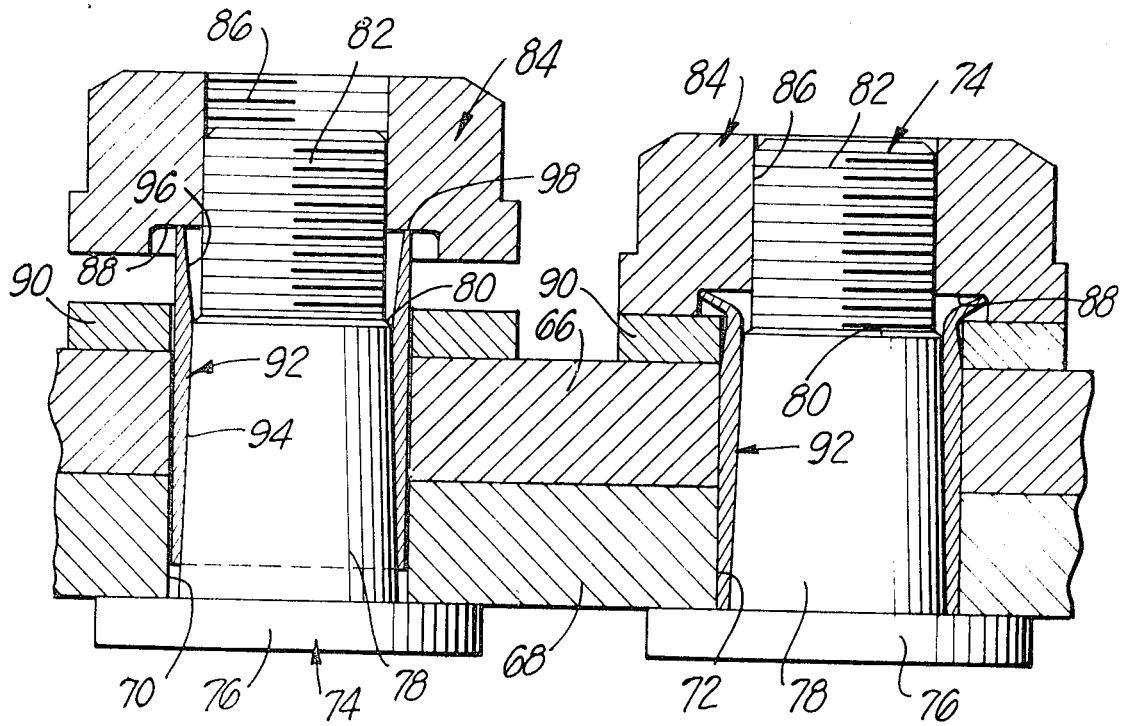
FIG. 6 is a section taken through two of the bolts of the bolt embodiment of the sealing fastener of this invention, showing such bolts installed in openings in pieces of material to be secured together, one of such bolts being ready for upsetting, and the other bolt tightened and the upsetting complete.

Referring now to the drawings in more detail, the preferred embodiment sealing fastener of this invention is generally indicated at 10. Three identical sealing rivets are shown in FIG. 4, the three being shown in different stages of the installation. In view of the fact that they are identical, the corresponding parts are identified by the same reference characters. FIGS. 1 through 3 individually show the separate parts of the sealing rivet 10. FIG. 1 shows the main body at 12, FIG. 2 shows the ductile sleeve 14 and FIG. 3 shows the retainer button 16.

Referring primarily to FIG. 1, the main body 12 has a stem 18 and a head 20. Preferably, the main body 12 as well as the sleeve 14 and retainer button 16 are all formed with surfaces of revolution so as to be easily manufactured. Thus, body 12 has an axis. Head 20 is formed as a solid cylinder about this axis. Head 20 has an engaging surface 22. Stem 18 extends upward from head 20 and has several surfaces of revolution about the axis. Closest to the head, tapered surface 24 extends from engaging surface 22. Tapered surface 24 is a portion of a cone, with its largest diameter at head 20. Tapered surface 24 is of sufficient length so as to preferably extend completely through the pieces 26 and 28 which are to be fastened together. Adjoining tapered surface 24 is groove 30 which terminates in abutment 32 which faces head 20. Preferably, the smallest diameter 34 of the tapered surface is preferably substantially equal to the stem diameter at cylindrical shoulder 36, directly above groove 30.

The just described portion of main body 12 is a permanent portion of the sealing rivet 10. Just above cylindrical shoulder 36, stem 18 is provided with snapoff groove 38. This groove is of such dimension that sufficient material remains in stem 18 to permit adequate tension to be placed upon the main body 12. However, groove 38 is also of such dimension to permit snapoff of the removable portion of stem 18, above groove 38. The removable portion of stem 18 is generally cylindrical about the axis of the main body. It is characterized by pull shoulder 40 which is formed by groove 42. While pull shoulder 40 is the preferred means of engaging stem 18, so that the main body 12 may be pulled in such a direction as to engage the engagement surface 22 of head 20 against piece 28, other engagement means may be used.

Ductile sleeve 14, in the undistorted form, has a cylindrical outer surface 44. It has a composite inner surface which is comprised of conical surface 46 and cylindrical surface 48. As is seen in the leftmost rivet in FIG. 4, the cylindrical surface fits over cylindrical shoulder 36 on stem 18, and conical surface 46 fits over tapered surface 24 so that with normal hand-applied forces it stops upon the surface 24 before it engages engagement surface 22, as seen for the leftmost rivet in FIG. 4. For rivets of moderate size, both the internal conical surface 46 and the external tapered surface 24 are at about 2° with respect to the axis. The upper end of ductile sleeve 14 terminates in push surface 50.

Retainer button 16, shown separately in FIG. 3 and shown in association with the outer parts in FIGS. 4 and 5, is also a member of revolution about the same axis. It has an engaging surface 52 which is adapted to engage against piece 26. It has a cylindrical bore 54 which is of such diameter, see the leftmost rivet 10 in FIG. 4, that it fits over the cylindrical outer surface 44 of sleeve 14 and generally corresponds in diameter to the holes 56 in pieces 26 and 28, and forms an extension of the holes 56. Facing away from engaging surface 52 is abutment 58, which is also in the form of a tapered surface similar to abutment 32. Above abutment 58, the interior of retainer button 16 has cylindrical bore 60. Thrust surface 62 forms the top of retainer button 16. The external surface of retainer button 16 preferably has conical surface 64 adjacent surface 62. Surface 64 is concentric about the axis so as to aid in directly centering the button 16. The remaining external surface of retainer button 16 is not critical and may be of any desired shape. The groove shown facilitates removal of retainer 16 without damage to pieces 26 and 28.

The particular disclosed design of the rivet 10 permits the use of high strength, alloy material in the main body 12 and retainer button 16. These high-strength materials normally have such low ductility that they do not permit riveting. While the rivet 10 is of such nature to permit the use of these high-strength materials, they are preferably used to provide a high-performance finished rivet structure, and they are thus preferred but are not necessary in every application. However, the material of sleeve 14 is necessarily ductile. Sleeve 14 may be of the same material, with such different physical properties from thermal treatment that it is more ductile than the other parts, or may be of different material. In some cases a different material is more desireable so as to reduce the friction of sleeve 14 sliding upon main body 12.

Assembly is easily accomplished. If desired, sleeve 14 may be thrust onto the taper of stem 18 to a sufficient extent to retain it in place for handling, manufacture installation ease or for retention of lubricant between the pieces. Thus, only two parts need be handled. Holes 56 are drilled through pieces 26 and 28. These holes may be of normal drill tolerance sizes, for the sleeve will extend into the holes to completely fill them. Thus, reaming to accurate finish and size is not necessary. Main body 12, with sleeve 14 in place is simply inserted through these holes and surface 22 is engaged against the side of piece 28. Retainer button 16 is placed over the upper portion of sleeve 14, to the position at the leftmost rivet in FIG. 4. In this condition, a suitable tool is engaged upon the rivet 10 so as to cause ductile deformation of the sleeve. The tool engages pull shoulder 40 of main body 12. The tool also engages retainer button 16. This engagement is preferably on conical surface 64 so as to axially align body 12 and button 16. Since sleeve 14 is already axially aligned in this manner by interengagement of the conical surfaces, the structure is fully lined up. The tool may also engage thrust surface 62, if desired. The first force applied is between these two parts. Thus, engagement surface 52 on the button is thrust toward engagement surface 22 on the head. This squeezes pieces 26 and 28 together.

The operating tool also engages upon push surface 50 of sleeve 14. Thus, the next step is the axial thrust upon push surface 50 to move sleeve 14 toward head 20. This initial motion causes expansion of the ductile sleeve by motion along tapered surface 24. This expansion causes partial engagement by the cylindrical outer surface 44 within the holes 56 tending to center the rivet with respect to the holes. This also pulls the two pieces 26 and 28 into line, should the holes therein be slightly out of line. The expansion of the cylindrical outer surface 44 takes out most of the assembly clearance before progressive upsetting takes place. This condition is shown on the center rivet 10 in FIG. 4. In view of the fact that drilled holes 56 are acceptable, they may be slightly oversized so as to be slightly larger than the now expanded lower cylindrical surface 44. This situation is shown in the center of FIG. 4.

The next step is to apply further force on push surface 50. This causes progressive upsetting of ductile sleeve 14. This progressiveness is caused by the fact that the walls of the sleeve are thinner at the lower end due to the conical surface 46. Since stresses are higher at the thinner section, progressive upsetting occurs from that end. By this means, ductile sleeve 14 expands into close engagement with the surfaces of the holes 56 so as to make a tight fit. Ductile sleeve 14 is supported upon cylindrical shoulder 36 so as to give it stability to prevent buckling of this thin wall tube under these stresses.

Progressive deformation takes place and progresses from head 20, upward along the tapered surface 24 filling holes 56, and finally reaches the zone between cylindrical bore 60 and groove 30. Deformation continues and sleeve 14 fills against abutment 58 abutment 32, complete filling groove 30. When ductile deformation is completed, the push surface 50 is approximately level with the bottom of snapoff groove 30 as is shown in the right of FIG. 4. The rivet then is ready to bear load. The upper end of stem 18 may be broken off at snapoff groove 38, to result in the finished rivet shown in FIG. 5.

In view of the fact that the sleeve of ductile material completely fills the hole, shear load transfer through the sleeve is principally by means of compressive stresses in the ductile sleeve material. These loads are conveyed to the main body 12, which has considerably greater shear strength to thus provide a composite structure which is capable of higher shear bearing loads than the ductile material in the sleeve is able to carry. It is thus seen that the rivet is assembled into a finished rivet, without the employment of large deformation forces during installation. However, due to forces between head 20 and button 16, accurately controlled preassembly forces are accomplished, and these are maintained by the deformation of the ductile sleeve. Since the ductile sleeve has a large shear area in the axial direction of the rivet, between abutment surfaces after the rivet is completely assembled, it is able to restrain high tensile forces. The ductile sleeve is also in position to transmit loads directly by compression from surface 32 to surface 58, in addition to the shear area provided.

Referring now to the embodiment of the sealing fastener shown therein, it is seen that this embodiment of the sealing fastener is in the form of a bolt. In the left-hand side of FIG. 6 the bolt is illustrated in the position where it is first installed, without tightening, into pieces of material to be secured and sealed together, and the right-hand half of this Figure shows the structure after completion of the tightening and the completion of sealing. Pieces 66 and 68 are to be fastened together, and are provided with separate sets of holes 70 and 72. The structure of the two bolts in these two holes is identical, except for the upset of the sleeve and the state of installation. Therefore, they will be described together with respect to the structural parts.

Bolt 74 has a head 76 which engages on the lower side of piece 68. It may have suitable restraining means thereon, so that it may be engaged and held by a suitable wrench. Thus, the exterior circumferential surface may be hexagonal, or the like so as to be engaged by an external wrench, or a nonround socket may extend into the head for key engagement. A shank 78 is secured to each head 76; each shank is uniformly tapered toward a reduced diameter to terminate in a shoulder 80 which preferably lies at the top surface of piece 66, or slightly thereabove as is shown. The shank of each bolt 74 above a shoulder 80 is threaded at 82 for engagement by a nut 84.

The nuts 84 have conventional wrench-engaging surfaces, which may be of any convenient nature for rotating the nuts 84 with respect to bolts 74. Each nut 84 has internal threads 86 for engagement upon the threads 82. The bottom face of each nut 84 is recessed at 88 to provide a bearing area for the sleeve during upsetting of the lower portion of the sleeve and a place for the upper portion of the sleeve to bend over, when upsetting is complete. A spacer 90 is provided as a conventional lock washer to lock each nut 84 in place after it is fully tightened. In the absence of this lockwasher, shoulder 80 is preferably even with the top surface of piece 66.

Sleeves 92 are used with the bolts 74. Each sleeve 92 initially has a tapered, conical internal surface 94 which engages upon the tapered, conical exterior of a shank 78. Both of these conical sections have a taper in the order of 5°. This angle is also desirable for the fastener embodiment of FIGS. 1 through 5. The tapered length of a surface 94 in engagement with shank 78 is substantially equal to the total thickness of the two pieces 66 and 68. The external diameter of a sleeve 92 is such as to permit its insertion within the holes 70 and 72, before it is upset. This condition is as shown at the left side of FIG. 6. The upper part of a sleeve 92, the part that extends above shoulder 80 in the original condition shown at the left of FIG. 6, it has also an interior conical surface 96. This surface preferably has a 14° total included cone angle.

A sleeve 92 also has an initial upper surface 98 which is engaged by the upper surface of recess 88 when nut 84 is screwed down on bolt 74. As torque is continued, so the sleeve 92 is jacked down upon the tapered portion of the shank 78. This causes expansion of the sleeve 92 until the bottom edge of sleeve 92 contacts the upper surface of head 76. During this movement, expansion occurs, but this expansion normally does not completely fill the holes 70 and 72. Continued movement of the nut 84 causes upsetting of the sleeve 92. This upsetting is progressive from the bottom edge of sleeve 92, for this is the thinnest point and progresses upward until the sleeve 92 is completely upset in the hole. At this point it resembles the portion of the sleeve 92 within the hole 72.

Continued torquing down of nut 84 generates a higher load which is sufficient to cause buckling failure of the upper, unsupported end of sleeve 92. This combines with the friction forces between the upper end of the sleeve 92 and the interior of the recess 88 to cause outward flaring of the upper end of the sleeve 92. When the flaring has started, the flared end can only produce a small fraction of the axial load onto the nut 84. This unloading permits easier turning of nut 84 and the unloading continues until the nut 84 is turned down tight. Thus, torque is available for a proper tensile clamping load upon shank 78 and compressive clamping load upon the pieces 66 and 68. Furthermore, the flared out portion of the sleeve 92 continues in contact with the nut and provides a positive lock to maintain sleeve 92 in position. This final position is indicated at the right side of FIG. 6.

This invention having been described in this preferred embodiment, and an additional embodiment shown, it is clear that it is subject to numerous modifications and embodiments without the exercise of the inventive faculty. Accordingly, the scope of this invention is defined by the scope of the following claims.

We claim:

1. A fastener, said fastener comprising a main body, a retainer and a ductile sleeve, said main body having a head, a stem having a tapered conical surface decreasing in diameter away from said head, said stem being attached to said head and an abutment shoulder on said stem, said abutment shoulder on said stem facing towards said head, said ductile sleeve being adapted to be positioned around said main body upon said stem, said ductile sleeve having a conical interior surface which is engageable with the conical surface on said stem, said ductile sleeve being longer than the distance between said head and said abutment shoulder on said main body, an abutment on said retainer, said retainer being adapted to be placed around said ductile sleeve and said stem so that said abutment on said retainer faces said abutment shoulder on said stem and so that said abutment on said retainer is closer to said head of said main body than is said abutment shoulder on said stem, said ductile sleeve being adapted to be deformed against said abutment shoulder on said stem and against said abutment on said retainer so as to interlock said retainer with respect to said stem said sleeve restraining said main body and said retainer against movement when deformed against said abutment shoulder on said body and against said abutment on said retainer.

2. The fastener of claim 1 wherein said conical surface on said ductile sleeve is of such size with respect to said conical surface on said stem that when said conical surfaces are placed together, without appreciable distortion of said ductile sleeve, said ductile sleeve is spaced from said head.

3. The fastener of claim 1 wherein said ductile sleeve has a substantially cylindrical outer surface, when undistorted, so as to adapt said stem and said ductile sleeve positioned thereon to be inserted in holes in pieces to be joined by said fastener.

4. The fastener of claim 1 wherein said sleeve has a thinner wall toward said head than toward said retainer so that upon axial loading of said sleeve toward said head, said sleeve progressively plastically deforms from its end adjacent said head toward its end away from said head.

5. The fastener of claim 1 wherein said stem has a tool-engaging pull shoulder thereon and said retainer has a tool-engaging surface thereon so that engagement by a tool on said pull shoulder and on said surface urges said retainer toward a concentric position with respect to said stem.

6. The fastener of claim 5 wherein said stem has a snapoff groove therein away from said pull shoulder.

7. A fastener as claimed in claim 1 wherein:

said conical surface on said ductile sleeve is of such size with respect to said conical surface on said stem that when said conical surfaces are placed together, without appreciable distortion of said ductile sleeve, said ductile sleeve is spaced from said head, said ductile sleeve has a substantially cylindrical outer surface, when undistorted, so as to adapt said stem and said ductile sleeve positioned thereon to be inserted in holes in pieces to be joined by said fastener, said stem has a tool-engaging pull shoulder thereon and said retainer has a tool-engaging surface thereon so that engagement by a tool on said pull shoulder and on said surface urges said retainer toward a concentric position with respect to said stem, and said stem has a snapoff groove therein away from said pull shoulder.

* * * * *